(12) United States Patent
Ohshitanai

(10) Patent No.: US 10,834,353 B2
(45) Date of Patent: Nov. 10, 2020

(54) IMAGE SENSOR AND CONTROL METHOD THEREFOR, AND IMAGE CAPTURING APPARATUS

(71) Applicant: CANON KABUSHIKI KAISHA, Tokyo (JP)

(72) Inventor: Kazuki Ohshitanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 16/387,665

(22) Filed: Apr. 18, 2019

(65) Prior Publication Data
US 2019/0327436 A1 Oct. 24, 2019

(30) Foreign Application Priority Data

Apr. 24, 2018 (JP) ................................ 2018-083367

(51) Int. Cl.
*H04N 5/378* (2011.01)
*H04N 5/369* (2011.01)
*H04N 5/357* (2011.01)

(52) U.S. Cl.
CPC ............. *H04N 5/378* (2013.01); *H04N 5/357* (2013.01); *H04N 5/36961* (2018.08)

(58) Field of Classification Search
CPC ...... H04N 5/37; H04N 5/36961; H04N 5/357; H04N 5/3575
USPC ....................................................... 348/241
See application file for complete search history.

(56) References Cited

U.S. PATENT DOCUMENTS

| 9,070,608 | B2 * | 6/2015 | Kim | ................... H01L 27/146 |
| 9,762,825 | B2 * | 9/2017 | Ebihara | ................... H04N 5/361 |
| 9,838,633 | B2 * | 12/2017 | Muto | ................... H04N 5/3765 |
| 10,194,105 | B2 * | 1/2019 | Ikuma | ................... H04N 5/365 |
| 10,212,375 | B2 * | 2/2019 | Kim | ................... H04N 5/37455 |
| 10,306,171 | B2 * | 5/2019 | Yoo | ................... H04N 5/3575 |
| 2006/0044170 | A1 * | 3/2006 | Boemler | ................... H04N 5/378 341/155 |
| 2012/0006974 | A1 * | 1/2012 | Egawa | ................... H04N 5/3742 250/208.1 |
| 2013/0063627 | A1 * | 3/2013 | Hashimoto | ........ H04N 5/37455 348/241 |
| 2014/0225760 | A1 * | 8/2014 | Yang | ................... H03M 1/007 341/155 |

(Continued)

FOREIGN PATENT DOCUMENTS

JP 2015-164278 A 9/2015

*Primary Examiner* — Pritham D Prabhakher
(74) *Attorney, Agent, or Firm* — Cowan, Liebowitz & Latman, P.C.

(57) ABSTRACT

An image sensor comprising: a generator that generates a plurality of reference signals having different slopes of potential change; a selector that selects one of the reference signals; and an analog/digital converter that converts an analog signal output from a pixel unit by first or second driving using the selected reference signal into a digital signal. In the first driving, a noise signal is converted into a plurality of first digital signals using the reference signals and a photoelectric conversion signal is converted into a second digital signal using one of the reference signals. In the second driving, the noise signal is converted into the first digital signal using a predetermined one of the reference signals and the photoelectric conversion signal is converted into the second digital signal using one of the reference signals. The first driving is performed intermittently.

19 Claims, 11 Drawing Sheets

(56) References Cited

U.S. PATENT DOCUMENTS

| | | | |
|---|---|---|---|
| 2015/0281616 A1* | 10/2015 | Muto | H04N 5/378 |
| | | | 348/322 |
| 2016/0301883 A1* | 10/2016 | Kim | H04N 5/3575 |
| 2016/0344963 A1* | 11/2016 | Liim | H04N 5/3745 |
| 2017/0085817 A1* | 3/2017 | Yeh | H03M 1/34 |
| 2017/0195590 A1* | 7/2017 | Bulteel | H04N 5/378 |
| 2017/0195603 A1* | 7/2017 | Kawazu | H04N 5/347 |
| 2017/0324910 A1* | 11/2017 | Yang | H04N 5/378 |
| 2018/0359441 A1* | 12/2018 | Luo | H04N 5/341 |

\* cited by examiner

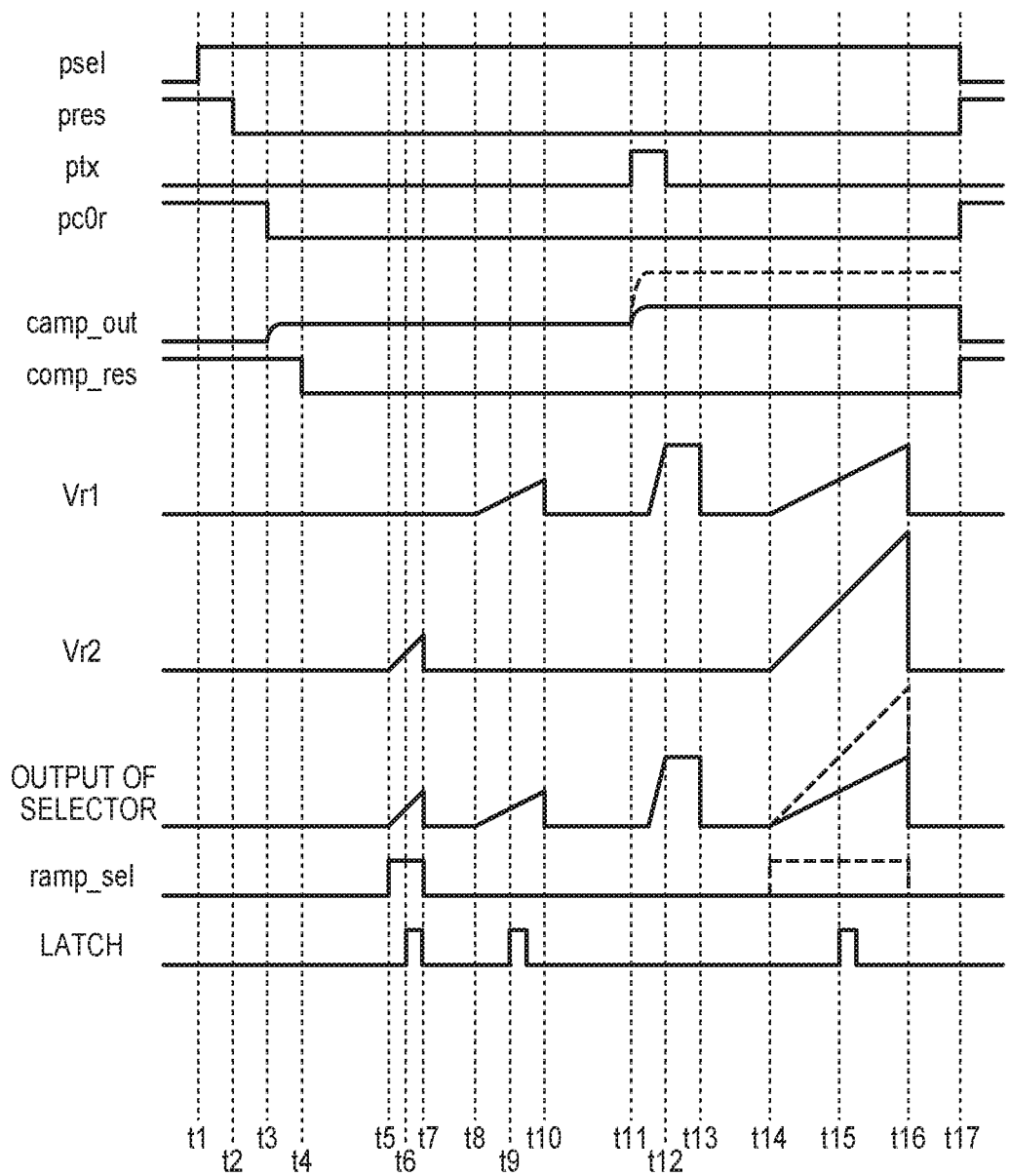

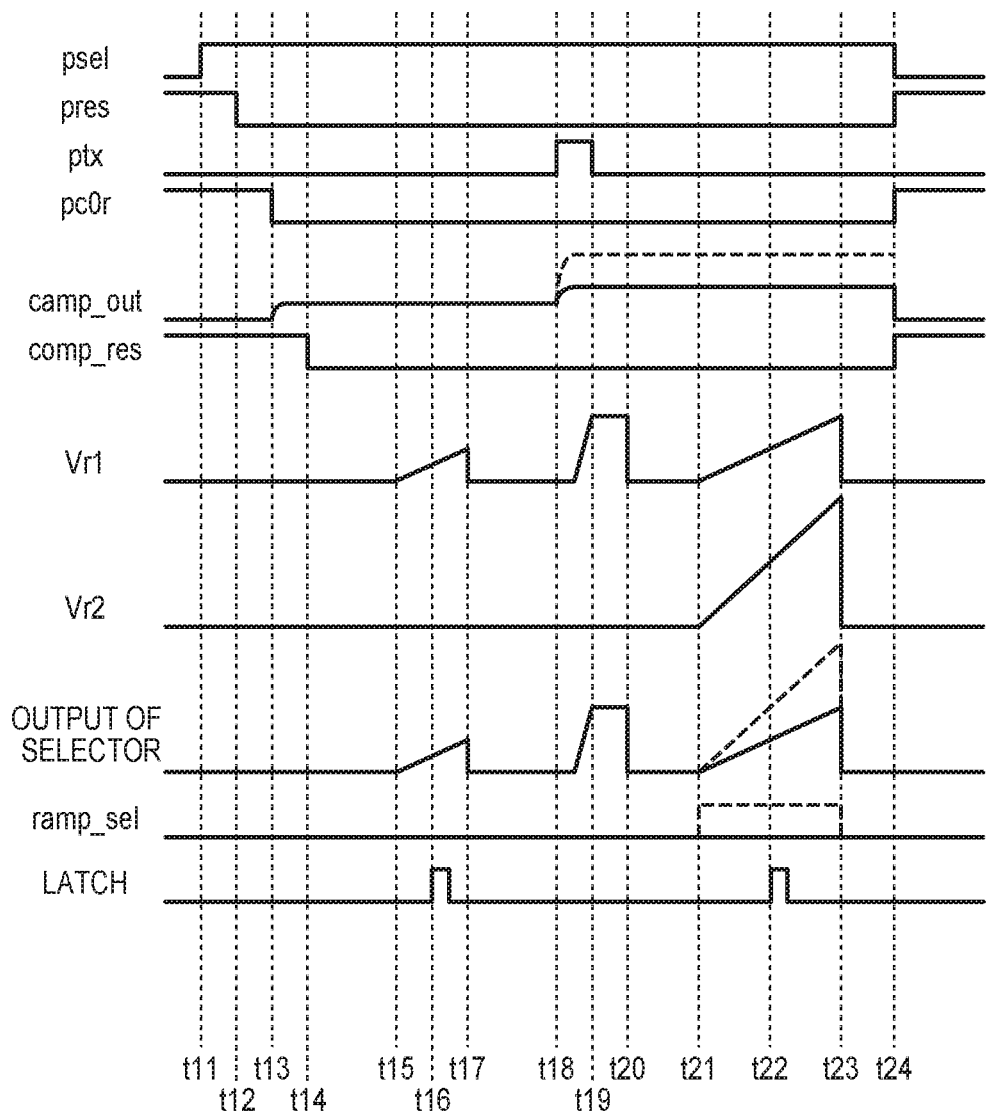

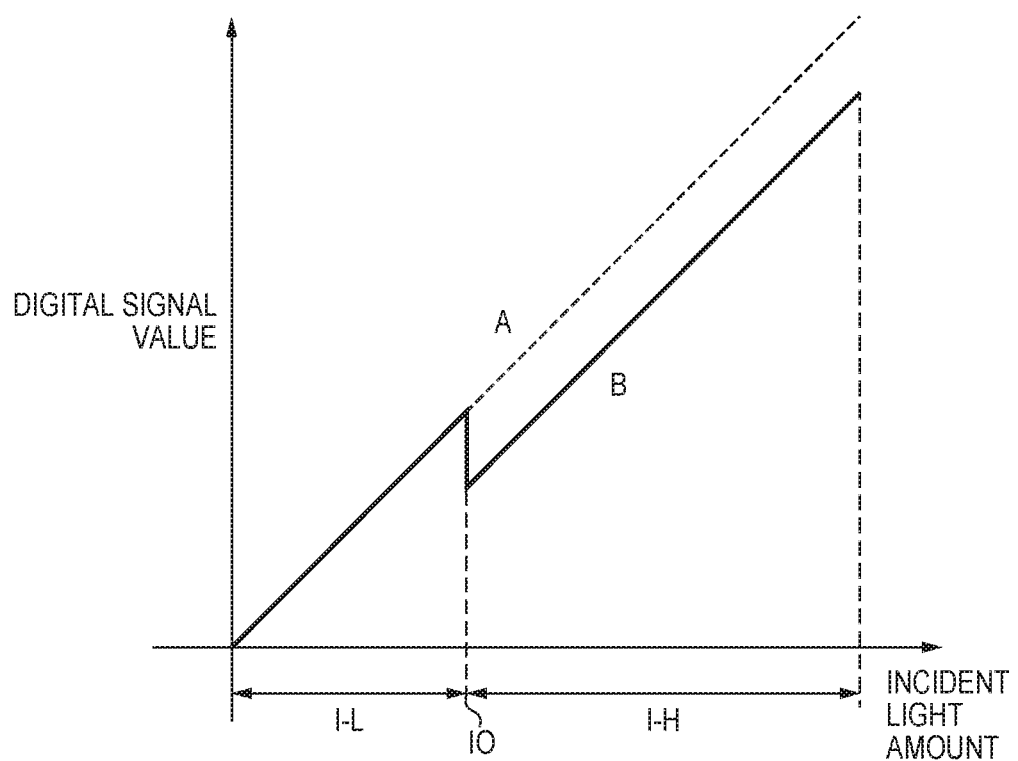

IMAGE SENSOR AND CONTROL METHOD THEREFOR, AND IMAGE CAPTURING APPARATUS

BACKGROUND OF THE INVENTION

Field of the Invention

The present invention relates to an image sensor having an A/D converter for converting a pixel signal output from a pixel into a digital signal, a control method therefor, and an image capturing apparatus.

Description of the Related Art

An invention related to an image sensor having an A/D converter for converting a pixel signal output from a pixel into a digital signal is disclosed. In the image capturing apparatus described in Japanese Patent Laid-Open No. 2015-164278, a comparator compares a noise signal with each of a first reference signal and a second reference signal whose potential change amounts per predetermined time are different from each other to perform an analog-to-digital (A/D) conversion on the noise signal. On the other hand, the comparator compares a photoelectric conversion signal with one of the first reference signal and the second reference signal to perform an A/D conversion on the photoelectric conversion signal.

However, in the conventional technique disclosed in Japanese Patent Laid-Open No. 2015-164278, there is a problem that a time taken for A/D conversion is prolonged because it is necessary to perform an A/D conversion twice on the noise signal.

SUMMARY OF THE INVENTION

The present invention has been made in consideration of the above situation, and reduces the time required for A/D conversion while suppressing deterioration of image quality.

According to the present invention, provided is an image sensor comprising: a generator that generates and outputs a plurality of reference signals whose slopes of potential change per predetermined time are different from each other; a selector that selects one of the plurality of reference signals; and an analog/digital converter that converts an analog signal output from a pixel unit row by row by first driving or second driving using the reference signal selected by the selector into a digital signal, wherein in the first driving, a noise signal output from the pixel unit is converted into a plurality of first digital signals using the plurality of reference signals and a photoelectric conversion signal obtained by performing photoelectric conversion on incident light and output from the pixel unit is converted into a second digital signal using one of the plurality of reference signals, in the second driving, the noise signal is converted into the first digital signal using a predetermined one of the plurality of reference signals and the photoelectric conversion signal is converted into the second digital signal using one of the plurality of reference signals, and the first driving is performed intermittently.

Further, according to the present invention, provided is an image sensor comprising: a pixel unit including pixels each having a plurality of photoelectric conversion portions and corresponding to each of a plurality of microlenses arranged in matrix; a generator that generates and outputs a plurality of reference signals whose slopes of potential change per predetermined time are different from each other; a selector that selects one of the plurality of reference signals; and an analog/digital converter that converts an analog signal output from a pixel unit row by row in a first mode or second mode using the reference signal selected by the selector into a digital signal, wherein in the first mode, a noise signal output from the pixel unit is converted into a first digital signal using a predetermined one of the plurality of reference signals and a first photoelectric conversion signal obtained by performing photoelectric conversion on incident light and output from the pixel unit is converted into a second digital signal using one of the plurality of reference signals, in the second mode, the noise signal is converted into a plurality of first digital signals using the plurality of reference signals and third and fourth photoelectric conversion signals that are read out from the pixel unit so as to be able to obtain a pair of focus detection signals having parallax are converted into third and fourth digital signals, respectively, using one of the plurality of reference signals, and signals from a row including an area in which focus detection is performed are processed in the second mode.

Furthermore, according to the present invention, provided is an image capturing apparatus comprising: an image sensor comprising a generator that generates and outputs a plurality of reference signals whose slopes of potential change per predetermined time are different from each other, a selector that selects one of the plurality of reference signals, and an analog/digital converter that converts an analog signal output from a pixel unit row by row by first driving or second driving using the reference signal selected by the selector into a digital signal; and a signal processor that processes a signal output from the image sensor, wherein in the first driving, a noise signal output from the pixel unit is converted into a plurality of first digital signals using the plurality of reference signals and a photoelectric conversion signal obtained by performing photoelectric conversion on incident light and output from the pixel unit is converted into a second digital signal using one of the plurality of reference signals, in the second driving, the noise signal is converted into the first digital signal using a predetermined one of the plurality of reference signals and the photoelectric conversion signal is converted into the second digital signal using one of the plurality of reference signals, and the first driving is performed intermittently.

Further, according to the present invention, provided is an image capturing apparatus comprising: an image sensor comprising a pixel unit including pixels each having a plurality of photoelectric conversion portions and corresponding to each of a plurality of microlenses arranged in matrix, a generator that generates and outputs a plurality of reference signals whose slopes of potential change per predetermined time are different from each other, a selector that selects one of the plurality of reference signals, and an analog/digital converter that converts an analog signal output from a pixel unit row by row in a first mode or second mode using the reference signal selected by the selector into a digital signal; and a signal processor that processes a signal output from the image sensor, wherein in the first mode, a noise signal output from the pixel unit is converted into a first digital signal using a predetermined one of the plurality of reference signals and a first photoelectric conversion signal obtained by performing photoelectric conversion on incident light and output from the pixel unit is converted into a second digital signal using one of the plurality of reference signals, in the second mode, the noise signal is converted into a plurality of first digital signals using the plurality of reference signals and third and fourth photoelectric conversion signals that are read out from the pixel unit so as to be able to obtain a pair of focus detection signals having parallax are converted into third and fourth digital signals, respectively, using one of the plurality of reference signals, and signals from a row including an area in which focus detection is performed are processed in the second mode.

Further, according to the present invention, provided is a control method for an image sensor comprising a generator that generates and outputs a plurality of reference signals whose slopes of potential change per predetermined time are different from each other, a selector that selects one of the plurality of reference signals, and an analog/digital converter that converts an analog signal output from a pixel unit row by row by first driving or second driving using the reference signal selected by the selector into a digital signal, the method comprising: controlling to perform conversion row by row by the analog/digital converter by the first driving or the second driving; converting, in the first driving, a noise signal output from the pixel unit into a plurality of first digital signals using the plurality of reference signals and converting a photoelectric conversion signal obtained by performing photoelectric conversion on incident light and output from the pixel unit into a second digital signal using one of the plurality of reference signals; and converting, in the second driving, the noise signal into the first digital signal using a predetermined one of the plurality of reference signals and converting the photoelectric conversion signal into the second digital signal using one of the plurality of reference signals, wherein the first driving is performed intermittently.

Further, according to the present invention, provided is a control method for an image sensor comprising a pixel unit including pixels each having a plurality of photoelectric conversion portions and corresponding to each of a plurality of microlenses arranged in matrix, a generator that generates and outputs a plurality of reference signals whose slopes of potential change per predetermined time are different from each other, a selector that selects one of the plurality of reference signals, and an analog/digital converter that converts an analog signal output from a pixel unit row by row in a first mode or second mode using the reference signal selected by the selector into a digital signal, the method comprising: controlling to perform conversion row by row by the analog/digital converter in the first mode or the second mode; converting, in the first mode, a noise signal output from the pixel unit into a first digital signal using a predetermined one of the plurality of reference signals and converting a first photoelectric conversion signal obtained by performing photoelectric conversion on incident light and output from the pixel unit into a second digital signal using one of the plurality of reference signals; and converting, in the second mode, the noise signal is converted into a plurality of first digital signals using the plurality of reference signals and converting third and fourth photoelectric conversion signals that are read out from the pixel unit so as to be able to obtain a pair of focus detection signals having parallax into third and fourth digital signals, respectively, using one of the plurality of reference signals, wherein signals from a row including an area in which focus detection is performed are processed in the second mode.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a timing chart showing a drive timing of a first driving of the image sensor according to the first embodiment;

FIG. 5 is a timing chart showing a drive timing of a second driving of the image sensor according to the first embodiment;

FIG. 6 is a diagram for explaining a relationship between an incident light amount and a digital signal value in a case where reference signals having different potential change amounts per predetermined time are used;

DESCRIPTION OF THE EMBODIMENTS

Exemplary embodiments of the present invention will be described in detail in accordance with the accompanying drawings.

First Embodiment

Figure 1:
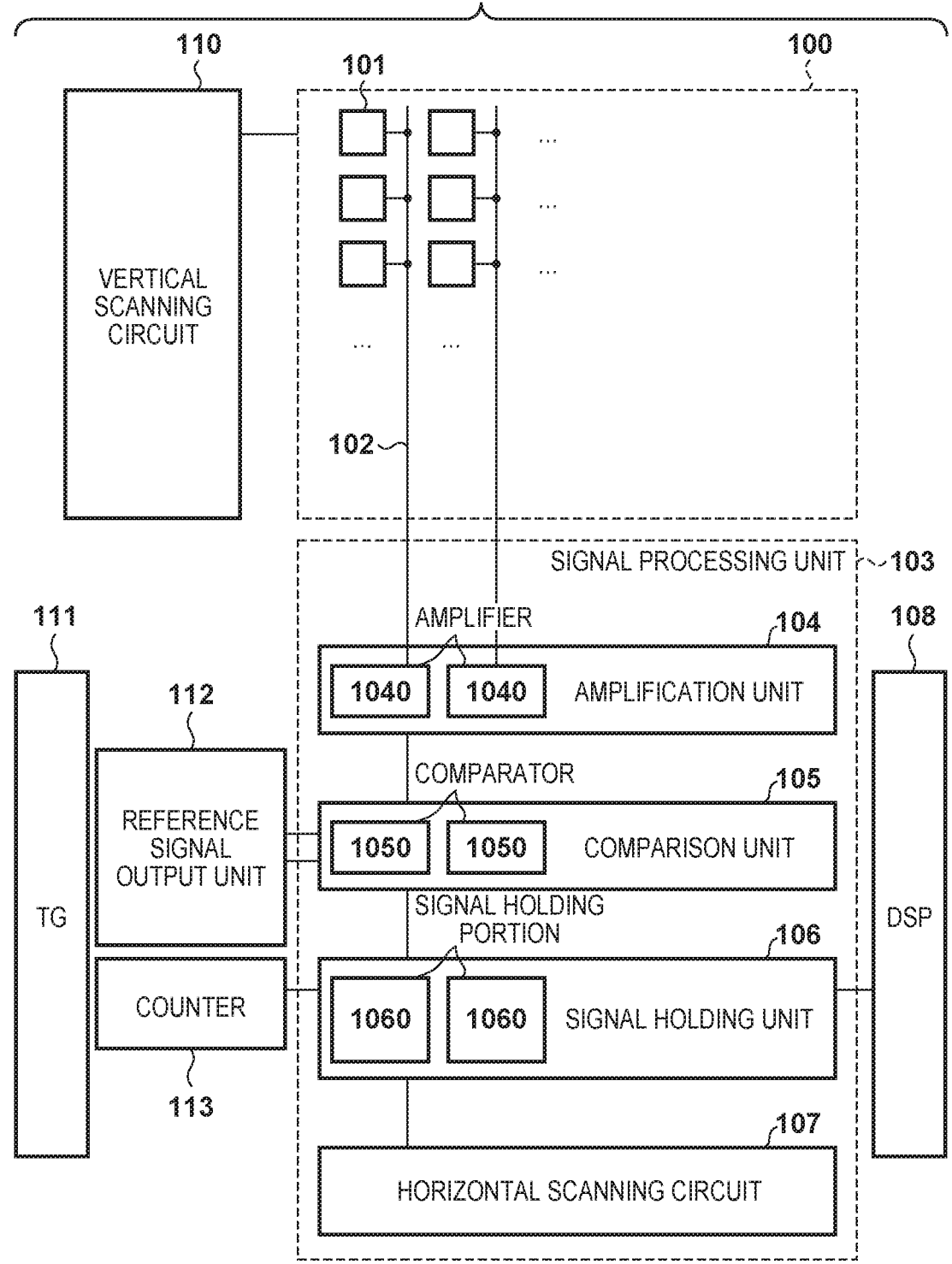
FIG. 1 is a block diagram showing a configuration of an image sensor according to an embodiment of the present invention.

FIG. 1 is a block diagram showing a configuration of an image sensor according to a first embodiment. A pixel array 100 (pixel portion) is composed of a plurality of pixels 101 arranged in a matrix. Based on the timing signal output from a timing generator (TG) 111, a vertical scanning circuit 110 sequentially scans the plurality of pixels 101 row by row and drives so as to read an image signal of one frame. Each pixel 101 outputs a noise signal which is an analog signal of a noise level, and an analog signal (hereinafter referred to as "photoelectric conversion signal") based on the electric charge generated by photoelectrically converting incident light, to vertical signal lines 102 provided for respective columns. Note that in FIG. 1, only the pixels 101 and the vertical signal lines 102 of two columns are shown, however in reality, the pixels 101 and the vertical signal lines 102 are provided over thousands of columns.

In a signal processing unit 103, an amplification unit 104, a comparison unit 105, a signal holding unit 106, and a horizontal scanning circuit 107 are provided. In the amplification unit 104, the comparison unit 105 and the signal holding unit 106, a plurality of amplifiers 1040, a plurality of comparators 1050 and a plurality of signal holding portions 1060 are provided for the respective vertical signal lines 102 of the respective columns.

The amplifiers 1040 output analog signals obtained by amplifying noise signals and photoelectric conversion signal which are output from the pixels 101 to the comparators 1050. The comparators 1050 compare the analog signal output from the amplifiers 1040 and s reference signal output from a reference signal output unit 112 and output latch signals to the signal holding portions 1060 based on the comparison result. A counter 113 outputs a count signal obtained by counting the clock signal CLK to the signal holding portions 1060. The signal holding portions 1060 hold the count signal output from the counter 113 as a digital signal when the latch signals output from the comparators 1050 change. In this manner, analog-digital conversion (A/D conversion) of the noise signals and the photoelectric conversion signals of pixels 101 are performed. In other words, the comparators 1050 and the signal holding portions 1060 constitute A/D converters, respectively, for converting analog signals into digital signals.

The horizontal scanning circuit 107 sequentially scans the signal holding portions 1060 of the respective columns. As a result, the digital signals held by the signal holding portions 1060 of the respective columns are sequentially transferred from the signal holding portions 1060 of the respective columns to the digital signal processor (DSP) 108. The DSP 108 processes the digital signals output from the signal holding units 106 and outputs processed digital signals to the outside of the image sensor.

The amplification unit 104, the comparison unit 105, the signal holding unit 106, the horizontal scanning circuit 107, the DSP 108, the reference signal output unit 112, and the counter 113 also operate based on the timing signal output from the TG 111.

Figure 2:
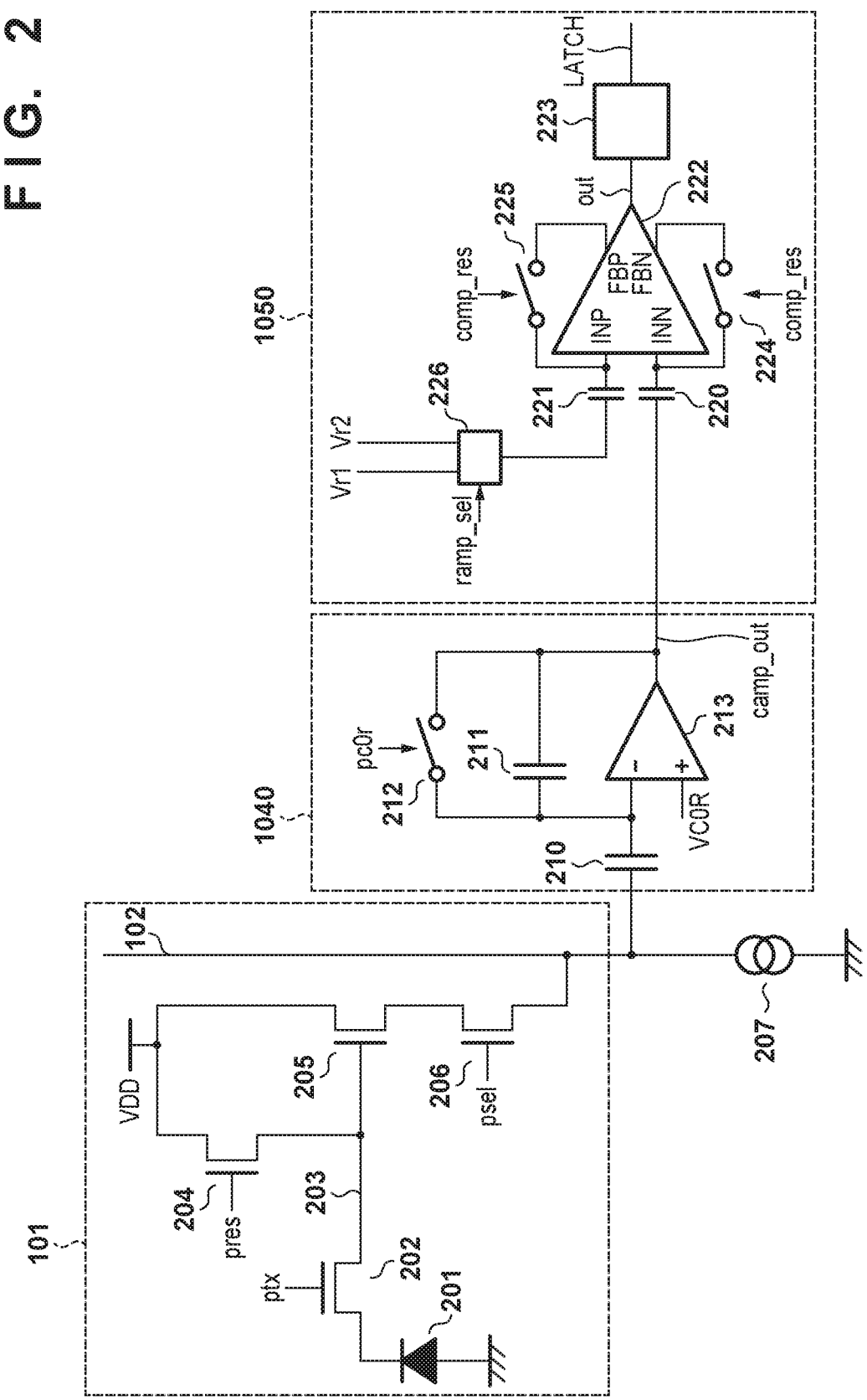
FIG. 2 is a diagram showing a circuit configuration of one pixel, and an amplification unit and a comparison unit for one column according to the first embodiment.

FIG. 2 is a diagram showing circuit configuration of one pixel 101, and the amplifier 1040 and the comparator 1050 for one column in the configuration of the image sensor having the configuration shown in FIG. 1. A photoelectric conversion portion 201 of pixels 101 photoelectrically converts incident light to generate electric charge. A transfer transistor 202 is provided in the electrical path between the photoelectric conversion portion 201 and a floating diffusion portion (FD portion) 203, and controls on/off of transfer of charge from the photoelectric conversion portion 201 to the FD portion 203. A source of a reset transistor 204 is electrically connected to the FD portion 203 and a drain thereof is supplied with a power supply voltage VDD to control the on/off of resetting the potential of the FD portion 203.

A gate of an amplifying transistor 205 is electrically connected to the FD portion 203, and a drain thereof is supplied with the power supply voltage VDD. A source of the amplifying transistor 205 is electrically connected to a selecting transistor 206. The vertical signal line 102 is electrically connected to a source of the selecting transistor 206, and switch between conduction and non-conduction between the amplifying transistor 205 and the vertical signal line 102. A current supply unit 207 supplies current to the amplifying transistor 205 of the pixel 101 via the vertical signal line 102. When turned on, the amplifying transistor 205 performs a source follower operation by the current supplied from the current supply unit 207 connected to the vertical signal line 102 and the power supply voltage VDD. As a result, an analog signal based on the potential of the FD portion 203 is output to the vertical signal line 102.

A signal ptx, a signal pres, and a signal psel are applied to the gates of the transfer transistor 202, reset transistor 204, and selecting transistor 206, respectively, from the vertical scanning circuit 110, respectively, and the transfer transistor 202, reset transistor 204, and selecting transistor 206 are controlled by these signals.

The amplifiers 1040 have an input capacitor 210, a feedback capacitor 211, a switch 212, and a differential amplifier 213. An inverting input terminal of the differential amplifier 213 is electrically connected to the node to which the input capacitor 210, the feedback capacitor 211, and the switch 212 are connected. A reference voltage VC0R is input to the non-inverting input terminal of the differential amplifier 213. The output terminal of the differential amplifier 213 is electrically connected to the node to which the feedback capacitor 211, the switch 212, and the comparator 1050 is connected. The switch 212 is supplied with the signal pc0r output from the TG 111. An amplification factor of the differential amplifier 213 is determined by the ratio of the capacitance values of the input capacitor 210 and the feedback capacitor 211.

The comparators 1050 have input capacitors 220 and 221, a comparator 222, a latch circuit 223, switches 224 and 225, and a selector 226. One input terminal INN of the comparator 222 is connected to the output of the amplifiers 1040 via the input capacitor 220 and is also connected to an output terminal FBN of the comparator 222 via the switch 224. A reference signal output from the selection unit 226 is input to the other input terminal INP of the comparator 222 via the input capacitance 221 and is also connected to an output terminal FBP of the comparator 222 via the switch 225. The switches 224 and 225 are supplied with a signal comp_res output from the TG 111. The latch circuit 223 outputs a latch signal whose signal value changes according to a change in a comparison result signal output from the comparator 222 to the signal holding portion 1060.

A first reference signal Vr1 and a second reference signal Vr2 are reference signals supplied from the reference signal output unit 112. As will be described later, the first reference signal Vr1 and the second reference signal Vr2 have different potential change amounts per predetermined time (inclination) from each other, at the time of the A/D conversion. In the first embodiment, it is assumed that the change amount per predetermined time of the second reference signal Vr2 is larger than that of the first reference signal Vr1. The selector 226 selects one of the first reference signal Vr1 and the second reference signal Vr2 based on a signal ramp_sel, and outputs it to the comparator 222. Here, the first reference signal Vr1 is selected when the signal ramp_sel is Low level (hereinafter referred to as "Lo"), and when the signal ramp_sel is High level (hereinafter referred to as "Hi"), the second reference signal Vr2 is selected.

Figure 3:
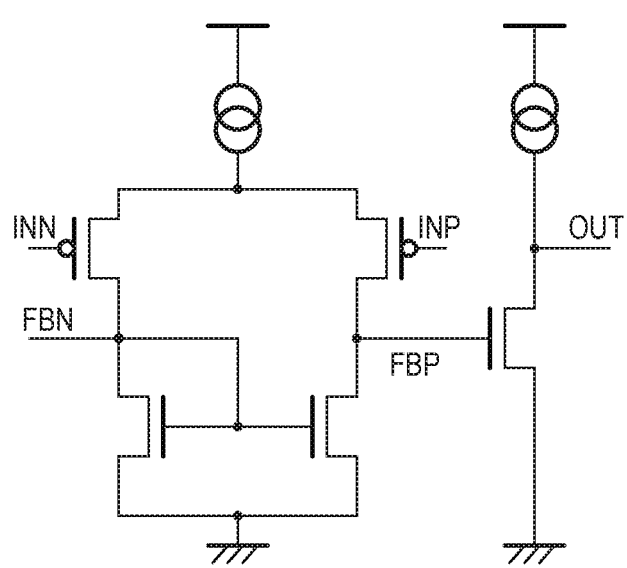
FIG. 3 is a circuit diagram showing an example of a configuration of a comparator according to the first embodiment.

FIG. 3 is a circuit diagram showing a configuration of the comparator 222, and the input terminals INN and INP, and the output terminals FBN and FBP correspond to those in FIG. 2.

A comparison between a noise signal and the first reference signal Vr1 is referred to as a first comparison, and a digital signal generated based on the result of the first comparison is referred to as a first digital signal. Further, a comparison between a noise signal and the second reference signal Vr2 is referred to as a second comparison, and a digital signal generated based on the result of the second comparison is referred to as a second digital signal. Furthermore, a comparison between a photoelectric conversion signal and the first reference signal Vr1 or the second reference signal Vr2 is referred to as a third comparison, and a digital signal generated based on the result of the third comparison is referred to as a third digital signal.

In the present embodiment, the driving of performing the first comparison, the second comparison, and the third comparison in a given row is referred to as a first driving. In addition, the driving of performing the first comparison and the third comparison without performing the second comparison is referred to as a second driving.

FIGS. 4 and 5 are timing charts showing drive timings for one row of the image sensor shown in FIGS. 1 and 2. Specifically, FIG. 4 shows the timing by the first driving, and FIG. 5 shows the timing by the second driving.

First, the drive timing of the first driving in each column shown in FIG. 4 will be described. At the time t1, the vertical scanning circuit 110 turns the signal psel of the row to be read to Hi, and the selecting transistor 206 is turned on. As a result, the amplifying transistor 205 of the pixel 101 is electrically connected to the vertical signal line 102 via the selecting transistor 206.

In addition, the TG 111 sets the signal pc0r to Hi, and the switch 212 is on. As a result, the feedback path between the output terminal of the differential amplifier 213 and the inverting input terminal becomes conductive, and the charge held by the feedback capacitor 211 and the inverting input terminal of the differential amplifier 213 are reset. At this time, an analog signal based on a potential VC0R of the non-inverting input terminal is output from the output terminal of the differential amplifier 213.

Further, the TG 111 sets the signal comp_res to Hi, and both the switchers 224 and 225 are on. As the switch 224 is turned on, the potentials of the output terminal FBN and the input terminal INN of the comparator 222 are reset, and as the switch 225 is turned on, the potentials of the output terminal FBP and the input terminal INP of the comparator 222 are reset.

At time t2, signal pres goes Lo, and the reset transistor 204 is turned off. As a result, resetting of the FD portion 203 is released. From the pixel 101, a noise signal which represents the potential of the vertical signal line 102 based on the potential of the reset FD portion 203 is output.

At time t3, the TG 111 sets the signal pc0r to Lo and turns off the switch 212. As a result, the input capacitor 210 clamps the noise signal including the noise component of the amplifier 1040. The noise signal clamped to the amplifier 1040 contains a charge re-injection component when the switch 212 changes from on to off. The charge re-injection component is generated as the result of a phenomenon in which the charge under the gate of the switch 212 moves to the inverting input terminal and the output terminal of the differential amplifier when the switch 212 changes from on to off. Since the charge re-injection component differs from column to column, different offset components are output from the amplifiers 1040 between the columns.

At time t4, the TG 111 sets the signal comp_res to Lo and the switches 224 and 225 turn off. The potential of the input terminal INN of the comparator 222 at this time is the reset potential based on the first reference signal Vr1. Charge based on the potential of the first reference signal Vr1 at time t3 is clamped to the input capacitor 221. Also, the input capacitor 220 clamps charge based on the potential of the output of the comparator 222 at time t3. The noise signal held by the input capacitor 220 includes the noise component of the comparator 1050 including the charge re-injection component when the switch 224 changes from on to off. Similarly, the signal held by the input capacitor 221 contains the charge re-injection component when the switch 225 changes from on to off.

At time t5, the reference signal output unit 112 starts changing the potential of the second reference signal Vr2 with respect to time. Further, the signal ramp_sel for controlling the selector 226 becomes Hi, and the selector 226 outputs the second reference signal Vr2. Meanwhile, the counter 113 starts the counting operation of the clock signal.

At time t6, the magnitude relationship between the signal output from the amplifier 1040 and the reference signal Vr2 is reversed, the output signal of the comparator 222 changes, and the latch signal LATCH changes from Lo to Hi. The signal holding portion 1060 holds the count signal in response to the change of the latch signal LATCH from Lo to Hi. The digital signal held by the signal holding portion 1060 at this time is the second digital signals. The comparison between the potentials of the input terminals INN and INP performed by the comparator 222 when generating the second digital signal is the second comparison.

At time t7, the reference signal output unit 112 stops changing the potential of the second reference signal Vr2 with respect to time, and sets the potential of the second reference signal Vr2 to the potential at time t3. Further, the signal ramp_sel for controlling the selectors 226 is set to Lo. As a result, the selector 226 switch the reference signal to be output to the comparator 222 from the second reference signal Vr2 to the first reference signal Vr1. On the other hand, the counter 113 stops the counting operation of the clock signal and resets the count value.

At time t8, the reference signal output unit 112 starts changing the potential of the first reference signal Vr1 with respect to time. Meanwhile, the counter 113 starts the counting operation of the clock signal.

At time t9, the magnitude relationship between the signal output from the amplifier 1040 and the first reference signal Vr1 is reversed, the output signals of the comparators 222 change, and the latch signal LATCH changes from Lo to Hi. The signal holding portions 1060 hold the count signal at this time in response to the change of the latch signals LATCH from Lo to Hi. The count signal held by the signal holding portion 1060 is the first digital signal. The comparison between the potentials of the input terminals INN and INP performed by the comparator 222 when generating the first digital signal is the first comparison. Both the first digital signals and the second digital signals are digital signals based on noise signals.

At time t10, the reference signal output unit 112 stops changing the potential of the first reference signal Vr1 with respect to time, and sets the potential of the first reference signal Vr1 to the potential at time t3. On the other hand, the counter 113 stops the counting operation of the clock signal and resets the count value.

At time t11, the vertical scanning circuit 110 sets the signal ptx to Hi. As a result, the pixel 101 outputs a photoelectric conversion signal to the vertical signal line 102. Since the input capacitor 210 holds charge based on the noise component of the pixel 101, a photoelectric conversion signal from which the noise component of the pixel is subtracted is output to the differential amplifier 213. Accordingly, the amplifier 1040 outputs a signal obtained by amplifying the photoelectric conversion signal from which the noise component of the pixel 101 is subtracted to the comparator 1050. The input capacitor 220 holds charge based on the differential amplifier 213 at time t3. Therefore, the signal from which the offset component of the differential amplifier 213 has been subtracted is output to the input terminal INN of the comparator 1050.

At time t12, the reference signal output unit 112 sets the potential of the first reference signal Vr1 to a potential VREF (predetermined signal level). The potential VREF is substantially equal to the potential of the first reference signal Vr1 at time t16 which will be described later. Note that the potential VREF is preferably equal to or lower than the potential of the first reference signal Vr1 at time t16.

If a signal output from the amplifier 1040 is larger than the potential VREF (predetermined signal level), the comparator 1050 outputs the comparison result signal of Hi. Conversely, when the signal output from the amplifier 1040 is equal to or lower than the potential VREF (equal to or lower than the predetermined signal level), the comparator 1050 outputs the comparison result signal of Lo.

The comparison result signal is held in the signal holding portion 1060 between time t12 and time t13. At time t13, the reference signal output unit 112 makes the potential of the first reference signal Vr1 equal to the potential at time t3.

At time t14, the held comparison result signal is reflected on the signal ramp_sel. When the signal output from the amplifier 1040 is larger than the potential VREF, the signal ramp_sel becomes Hi and the selector 226 outputs the second reference signal Vr2. Conversely, when the signal output from the amplifier 1040 is lower than or equal to the potential VREF, the signal ramp_sel remains Lo and the selector 226 continues to output the first reference signal Vr1.

Similarly, at time t14, the reference signal output unit 112 starts changing the potentials of the first reference signal Vr1 and the second reference signal Vr2 with respect to time. In other words, the reference signal output unit 112 outputs the first reference signal Vr1 and the second reference signal Vr2, both of which potentials change with reference to time, to the selector 226 in each column in parallel. The counter 113 starts the counting operation of the clock signal.

At time t15, the magnitude relation between the signal output from the amplifier 1040 and the reference signal Vr1 or Vr2 is reversed, and the signal value of the comparison result signal changes. The signal holding portion 1060 holds the count signal at this time. At this time, the count signal held by the signal holding portion 1060 is the third digital signal. The third digital signal is a digital signal based on the photoelectric conversion signal. The comparison of the potentials of the input terminals INN and INP performed by the comparator 222 when generating the third digital signal is the third comparison.

At time t16, the reference signal output unit 112 stops changing the potentials of the first reference signal Vr1 and the second reference signal Vr2 with respect to time, sets the potentials of the first reference signal Vr1 and the second reference signal Vr2 to the potentials at time t3. Further, the signal ramp_sel for controlling the selector 226 becomes Lo if it was Hi at time t14, and remains Lo when it was Lo at time t14. On the other hand, the counter 113 stops the counting operation of the clock signal and resets the count value.

At time t17, the vertical scanning circuit 110 sets the signal psel to Lo and the selecting transistor 206 is turned off. As a result, the amplifying transistor 205 of the pixel 101 is electrically disconnected from the vertical signal line 102 via the selecting transistor 206. The signal pres goes Hi, and the reset transistor 204 is turned on. As a result, the FD portion 203 is reset to the power supply voltage VDD. The signal pc0r and the signal comp_res become Hi, and as with time t1, the amplifier 1040 and the comparator 1050 become the reset state.

After time t17, the horizontal scanning circuit 107 sequentially scans the signal holding portions 1060 to output the digital signals of respective columns held by the signal holding portions 1060 to the DSP 108.

As described above, in each column, one of the first digital signal and the second digital signal based on the noise signal generated using the first reference signal Vr1 and the second reference signal Vr2 and the third digital signal are output to the DSP 108. As the third digital signal, when the signal output from the amplifier 1040 is equal to or lower than the potential VREF, a digital signal based on the photoelectric conversion signal generated using the first reference signal Vr1 is output. On the other hand, when the signal output from the amplifier 1040 is larger than the potential VREF, a digital signal based on the photoelectric conversion signal generated using the second reference signal Vr2 is output.

The digital signal based on the photoelectric conversion signal contains the component of the digital signal based on the noise signal. Therefore, the DSP 108 subtracts the digital signal based on the noise signal from the digital signal based on the photoelectric conversion signal, thereby generating a digital signal (S-N signal) with a lower noise signal. For the column in which the photoelectric conversion signal is AD-converted using the first reference signal Vr1, the S-N signal is obtained by subjecting first digital signal from the third digital signal which was AD-converted using the first reference signal Vr1. For the column in which the photoelectric conversion signal is AD-converted using the second reference signal Vr2, the S-N signal is obtained by subtracting the second digital signal from the third digital signal which was AD-converted using the second reference signal Vr2.

Further, the DSP 108 performs a process of multiplying the S-N signal by a gain based on the ratio of the slopes of the first reference signal Vr1 and the second reference signal Vr2 for the column in which the photoelectric conversion signal is AD-converted using the second reference signal Vr2. For example, if the slope of the second reference signal Vr2 is four times the slope of the first reference signal Vr1, the DSP 108 performs processing to multiply the value of the S-N signal by 4 for the column in which the photoelectric conversion signal is AD-converted using the second reference signal Vr2. Therefore, the signal value obtained by multiplying the digital signal obtained by using the second reference signal Vr2 by 4 ideally coincides with the digital signal value obtained by using the first reference signal Vr1, and the time required for A/D conversion using the second reference signal Vr2 is ¼ of the time required for A/D conversion using the first reference signal Vr1.

Next, the drive timing of the second driving will be described with reference to FIG. 5. In FIG. 5, the operation from time t11 to time t14 is the same as the operation from time t1 to time t4 described with reference to FIG. 4, and thus the description thereof is omitted. From time t15 to time t17, the first comparison between the noise signal and the first reference signal Vr1 is performed in the same manner as from time t8 to time t10 in FIG. 4. In the second driving, the second comparison between the noise signal and the second reference signal Vr2 performed from time t5 to time t7 in FIG. 4 is not performed. Because the driving timing after time 18 is the same drive timing as that after time t11 in FIG. 4, the description will be omitted.

Next, with reference to FIG. 6, the digital signal processed and output by the DSP 108 will be described. In FIG. 6, the horizontal axis indicates the amount of light incident on the photoelectric conversion portion of the pixel 101, and the vertical axis indicates the signal value of the digital signal output from the DSP 108. Further, a graph A shows a case where a digital signal is generated using the first reference signal Vr1, and a graph B shows a case where a digital signal is generated using the second reference signal Vr2. As described above, the DSP 108 outputs the digital signal obtained by using the second reference signal Vr2 and multiplied by the reciprocal of the ratio of the slope of the first reference signal Vr1 and the slope of the second reference signal Vr2.

A region I-L is a range where the first reference signal Vr1 is used as the reference signal to be compared with the signal output from the amplifier 1040, and a region I-H is a range where the second reference signal Vr2 is used as the reference signal to be compared with the signal output from the amplifier 1040. In the region I-L, an amount of incident light is smaller than that in the region I-H. Therefore, when the amount of incident light is small, by using the first reference signal Vr1, the comparator 1050 can perform A/D conversion with higher resolution than using the second reference signal Vr2. On the other hand, when the amount of incident light is large, the comparator 1050 performs A/D conversion using the second reference signal Vr2. This makes it possible to increase the range of analog signals that can be compared in the same time period that the comparison is performed using the first reference signal Vr1.

IO shown in FIG. 6 indicates the boundary between the region I-L and the region I-H. An offset occurs in the light intensity value at the boundary 10. Therefore, an S-N signal is generated by performing A/D conversion on the noise signal using the first reference signal Vr1 and the second reference signal Vr2, and subtracting the noise signal which is AD-converted using the same reference signal as the reference signal used in the A/D conversion on the photoelectric conversion signal from the photoelectric conversion signal. In this manner, it is possible to remove the influence of the offset and to maintain good linearity of the digital signal with respect to the incident light amount. However, there is a problem in which it takes time to perform A/D conversion twice on the noise signal.

Therefore, in the first embodiment, control is performed so as to intermittently perform the first driving in which the A/D conversion on the noise signal is performed twice and the second driving in which the A/D conversion on the noise signal is performed once, in units of rows. Thus, it is possible to shorten the A/D conversion time by a period for comparing the noise signal and the second reference signal Vr2.

Figure 7B:
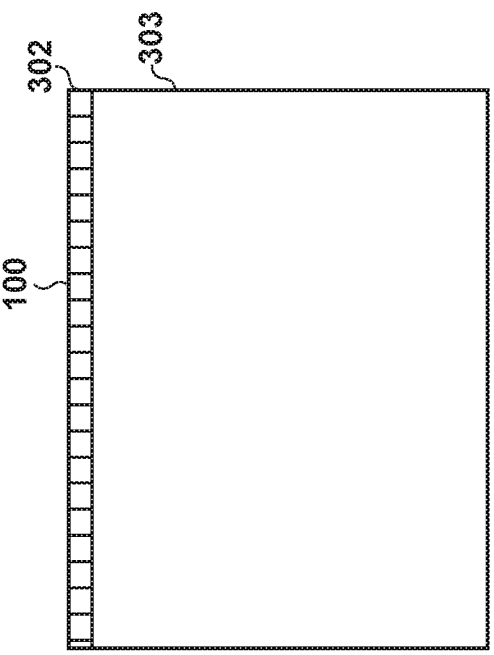
FIG. 7A and FIG. 7B are views showing examples of regions in which the first driving and the second driving are performed, respectively, in the first embodiment.
Figure 7A:
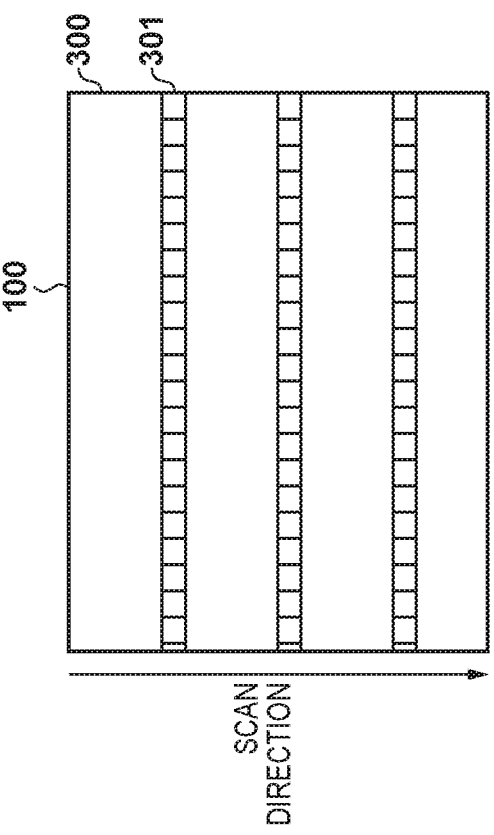

FIG. 7A is a diagram showing pixel areas in which the first driving and the second driving are performed. In the pixel array 100, a pixel area 300 indicates an area where A/D conversion is performed by the second driving. In addition, the pixel area 301 indicates an area where A/D conversion is performed by the first driving. As the vertical scanning circuit 110 sequentially scans the pixels 101 on a row-by-row basis, the first driving and the second driving are switched by the TG 111 so that the first driving is intermittently performed. The more the number of rows performing the second driving, the longer A/D conversion time that can be shortened.

In a case where the second reference signal Vr2 is not used to perform A/D conversion on the noise signal in the second driving, the DSP 108 calculates the S-N signal using the second digital signal last held in the signal holding portions 1060. By intermittently performing the first driving, the second digital signal held in the signal holding portions 1060 is updated intermittently.

As described above, the image sensor according to the first embodiment can shorten the signal reading time without significantly degrading the image quality.

In the first embodiment, the analog signal output from the amplifiers 1040 is input to the comparators 1050. However, the present invention is not limited to this, and may have a circuit configuration in which no amplifier 1040 is provided and a signal based on an analog signal on the vertical signal line 102 is input to the comparator 1050 via a configuration that performs a predetermined clamping process.

Further, in the first embodiment, the first driving in which comparison between the noise signal and the second reference signal Vr2 having a steeper slope is performed is intermittently performed during one frame period. However, as shown in FIG. 7B, the first driving may be performed at the beginning of the frame. A pixel area 302 is an area of a row in which the first driving is performed, and a pixel area 303 is an area of rows in which the second driving is performed. The first driving is performed in the pixel region 302 at the head of the frame where row scanning is started.

Also, the rate and frequency of the first driving intermittently performed may be changed according to gain setting of the amplifiers 1040 and sensor temperature. For example, as the temperature rises, the charge re-injection amount of the switches 212, 224, and 225 increases, so that the frequency of performing the first driving is increased. Further, as the gain increases, an amplified noise component also increases, so the frequency of performing the first driving is increased.

It should be noted that in the first embodiment, it is assumed that the second digital signals held in the signal holding portions 1060 are updated every time the first driving which is performed intermittently is performed. Besides, the signal holding portions 1060 may have a circuit configuration that calculates an average every time the second digital signal is acquired, or a circuit configuration that makes IIR (infinite impulse response).

Second Embodiment

Next, a second embodiment of the present invention will be described. Since the configuration of the image sensor in the second embodiment is the same as the configuration described with reference to FIG. 1 except for the configuration of each pixel 101, the description thereof will be omitted here.

Figure 8:
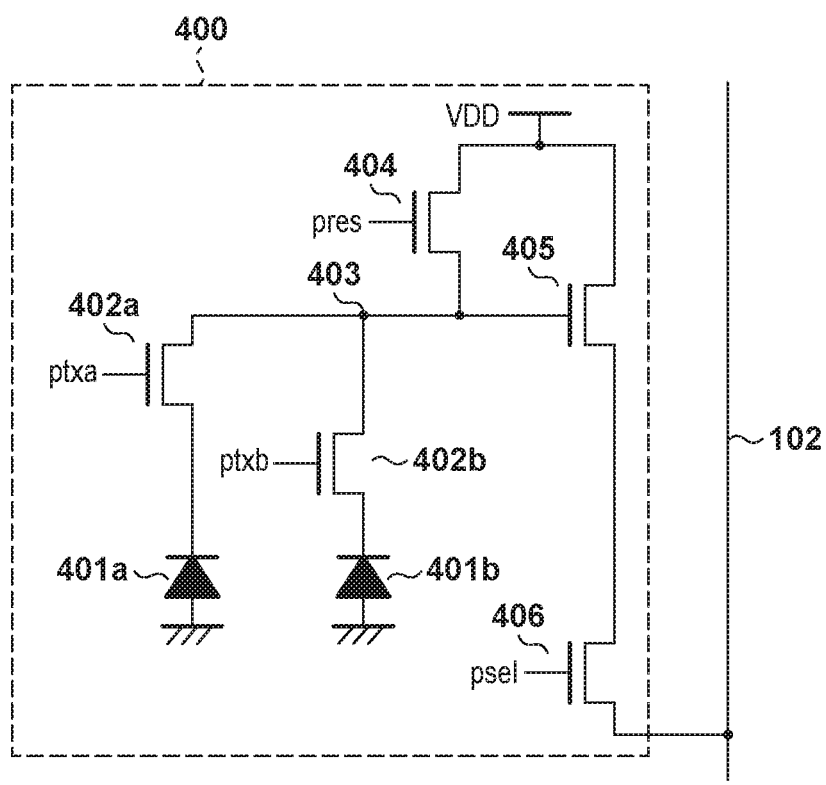
FIG. 8 is a diagram showing a circuit configuration of a pixel according to a second embodiment.

FIG. 8 is a circuit diagram showing a configuration of a pixel in the second embodiment of the present invention. The pixel array 100 in the second embodiment is configured by arranging pixels 400 capable of focus detection in a two-dimensional matrix. The pixel 400 includes photoelectric conversion portions 401a and 401b, transfer transistors 402a and 402b, an FD portion 403, a reset transistor 404, an amplifying transistor 405, and a selecting transistor 406. Though not shown in the figure, one common microlens for inputting light to the photoelectric conversion portions 401a and 401b is formed.

When light is incident on the photoelectric conversion portions 401a and 401b, signal charge corresponding to an amount of incident light is generated. The generated signal charge is transferred to the FD portion 403 by the transfer transistors 402a and 402b. The FD portion 403 converts the charge signal into a voltage signal. The reset transistor 404 resets the potential of the FD portion 403 to the power supply voltage VDD. The amplifying transistor 405 amplifies and outputs the voltage signal in the FD portion 403. The selecting transistor 406 selects a row of pixels from which signals are output.

Signals ptxa, ptxb, a signal pres, and a signal psel for driving the pixels are sequentially applied from the vertical scanning circuit 110 to the gates of the transfer transistors 402a and 402b, the reset transistor 404, and the selecting transistor 406, respectively. The pixels 400 for one column of the pixel array 100 are connected to the same vertical signal lines 102, and the pixel signals output to the vertical signal lines 102 are output to the outside via a readout circuit.

With such a configuration, focus detection signals and an image signal can be obtained. In order to obtain the focus detection signals to be used for phase difference focus detection, first, only the signal charge generated in the photoelectric conversion portion 401a or 401b is transferred to the FD portion 403, so that a signal of one of the photoelectric conversion portions of each of the plurality of pixels 400 arranged in matrix is read out. Next, the signal of the other of the photoelectric conversion portions 401a and 401b is transferred to the FD portion 403 and mixed, so that an image signal of each pixel 400 is read out. Then, by subtracting the signal of one of the photoelectric conversion portions read in advance from the image signal, a pair of focus detection signals having parallax and corresponding to the photoelectric conversion portions 401a and 401b can be obtained.

Note that the way of reading the focus detection signal and the image signal is not limited to this, and the signals of the photoelectric conversion portions 401a and 401b may be outputted to the outside independently and then combined. Namely, any read out method may be used as long as a pair of focus detection signals which have parallax and an image signal can be finally obtained. Further, as a configuration of the pixel transistor, an arbitrary configuration such as sharing one amplifying transistor 405 with two or more pixels may be applied.

If 1 HD period is set as the period during which an image signal for one row are read out, 2 HD periods are required to read out a focus detection signal and an image signal for one row. By scanning the rows without changing the HD period as the basic unit, it is possible to prevent an increase in the circuit scales of the vertical scanning circuit 110 and the TG 111.

When each pixel of the pixel array 100 has the configuration of the pixel 400, it takes many HD periods to read out the focus detection signal and the image signal from all the pixels. Therefore, in lines in which the focus detection signals are to be used, the focus detection signal and the image signal are read out, and in lines in which the focus detection signals are not to be used, only the image signal is read out. In this manner, it is possible to suppress an increase in the number of HD periods required.

In the second embodiment, a mode for sequentially reading a noise signal, the focus detection signal, and the image signal is referred to as a first readout mode. Further, a mode for reading the noise signal and the image signal in order without reading out the focus detection signal is referred to as a second readout mode.

In reading out the focus detection signal and the image signal, signal processing using a common noise signal in the DSP 108 is possible. Also, when reading out the focus detection signal and image signal over 2 HD periods, A/D conversion of noise signals, A/D conversion of a photoelectric conversion signal for focus detection, and A/D conversion of a photoelectric conversion signals for imaging are performed in this order. Here, when reading out the focus detection signal and the image signal, the time taken to perform the A/D conversion is shorter than in the case of reading out only the image signals for two rows in 2 HD periods. Therefore, this difference in time is used to perform A/D conversion twice on the noise signal. That is, the noise signal is compared with the first reference signal Vr1 and the second reference signal Vr2 only in the row from which the focus detection signal and the imaging signal are read out.

Figure 9:
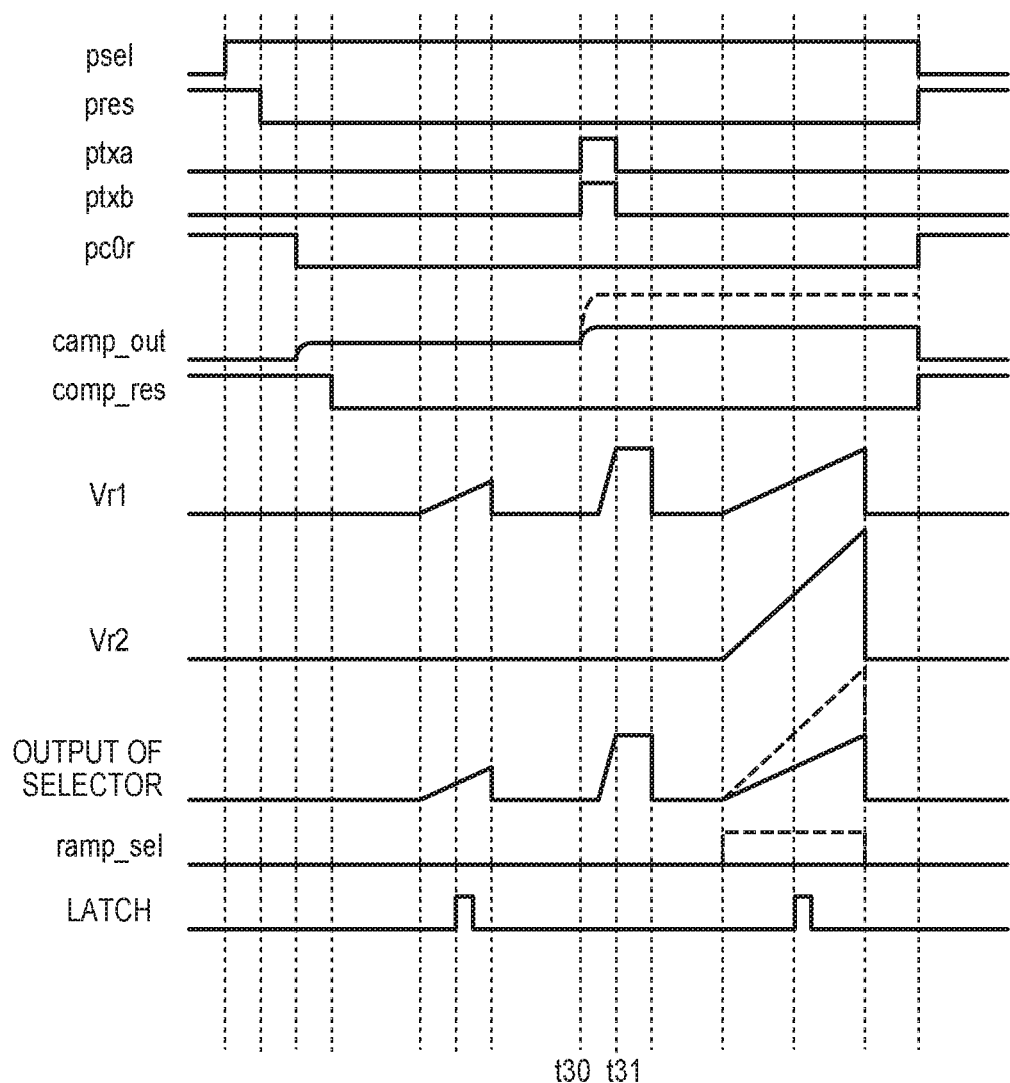
FIG. 9 is a timing chart showing a drive timing of the image sensor in a second readout mode according to the second embodiment.
Figure 10:
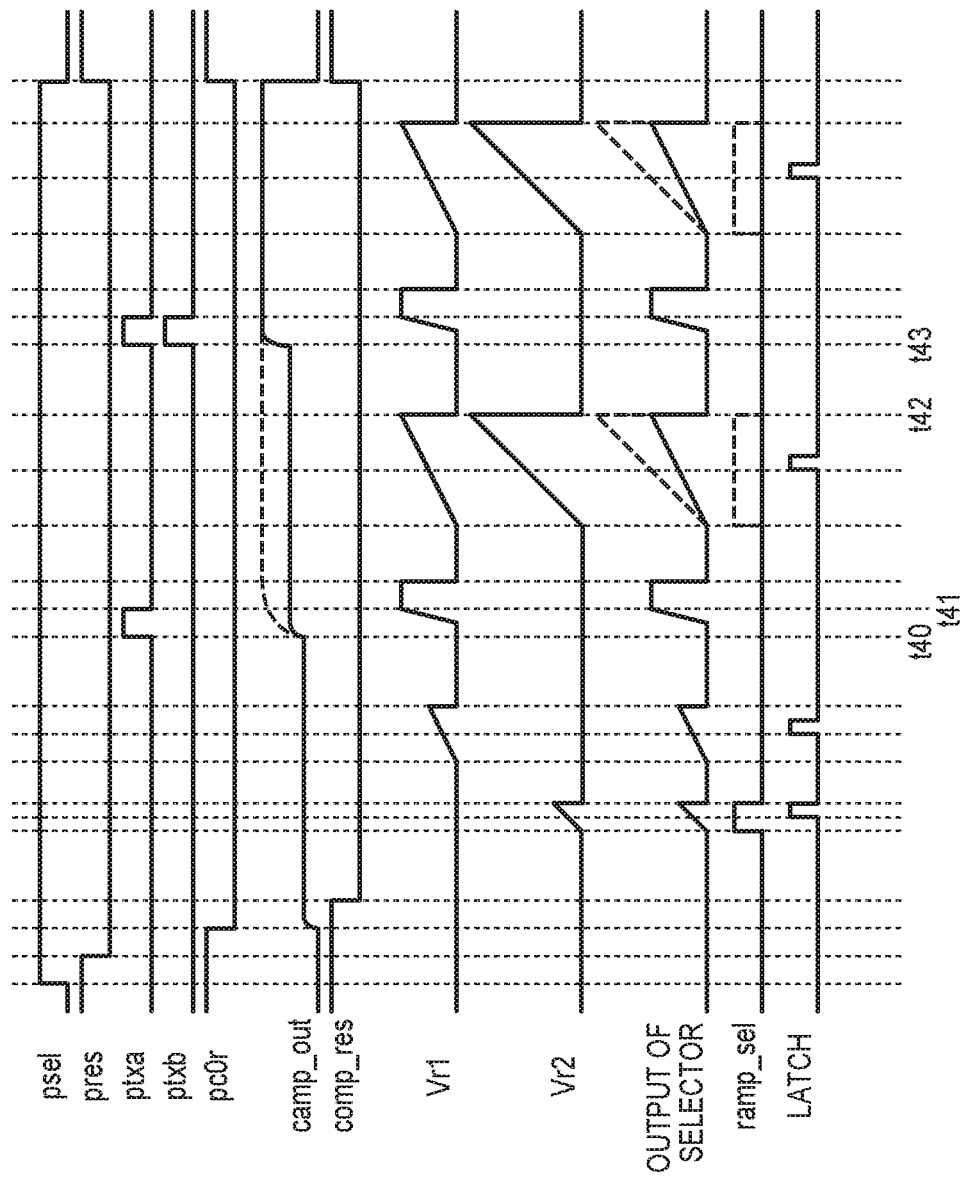
FIG. 10 is a timing chart showing a drive timing of the image sensor in a first readout mode according to the second embodiment.

FIGS. 9 and 10 are diagrams showing drive timings of the image sensor in the second embodiment.

FIG. 9 shows the drive timing in the second readout mode, with which reading out and A/D conversion of the noise signal and the image signal are performed by the second driving which performs the A/D conversion on the noise signal once. FIG. 9 is different from the second driving shown in FIG. 5 in that the signal ptxa and the signal ptxb are simultaneously set to Hi at the same time between time t30 and time t31. Other than this, the drive timing in FIG. 9 is the same as that described above with reference to FIG. 5, and thus the description thereof will be omitted. In this manner, in the second readout mode, the noise signal is compared with only the first reference signal Vr1, that is, A/D conversion is performed once.

FIG. 10 shows the drive timing in the first readout mode, and shows a driving method in which the noise signal is subjected to A/D conversion twice using the first reference signal Vr1 and the second reference signal Vr2.

In FIG. 10, until time t42, the drive timing is the same as that up to time t16 in first driving shown in FIG. 4 except that the signal ptxa is set to Hi from time t40 to time t41. The noise signal is compared with the first reference signal Vr1 and the second reference signal Vr2, respectively. That is, after performing the A/D conversion twice on the noise signal, the photoelectric conversion signal for focus detection output from the photoelectric conversion portion 401a is subjected to A/D conversion before time t42.

In the first readout mode, at time t43, the vertical scanning circuit 110 further sets the signals ptxa and ptxb to Hi. As a result, the signals of the photoelectric conversion portions 401a and 401b are transferred to the FD portion 403 and mixed, and the pixel 400 outputs the photoelectric conversion signal for imaging to the vertical signal line 102. Then, by performing the same driving as the driving after time t11 in FIG. 4, the photoelectric conversion signal for imaging is A/D converted. By driving as described above, it is possible to obtain two types of digital signals of the noise signal, a digital signal of the focus detection signal, and a digital signals of the image signal.

As described above, only in the row from which the focus detection signal and the image signal are read out, the A/D conversion on the noise signal is performed twice using reference signals whose potential change amounts per predetermined time are different from each other. As a result, it is possible to suppress the number of HD periods required in one frame while suppressing degradation of image quality.

In the second embodiment, the case where the pixel 400 is configured with two photoelectric conversion portions has been described, however, the pixel 400 may be configured with three or more photoelectric conversion portions.

Further, in the above-described first and second embodiments, the reference signals are two types of signals whose potential change amounts per predetermined time are different from each other. However, the present invention is not limited thereto, and is applicable to a case of using three or more types of reference signals whose potential change amounts per predetermined time are different from each other. In that case as well, it is possible to suppress the time required for A/D conversion while suppressing deterioration of image quality.

Third Embodiment

Figure 11:
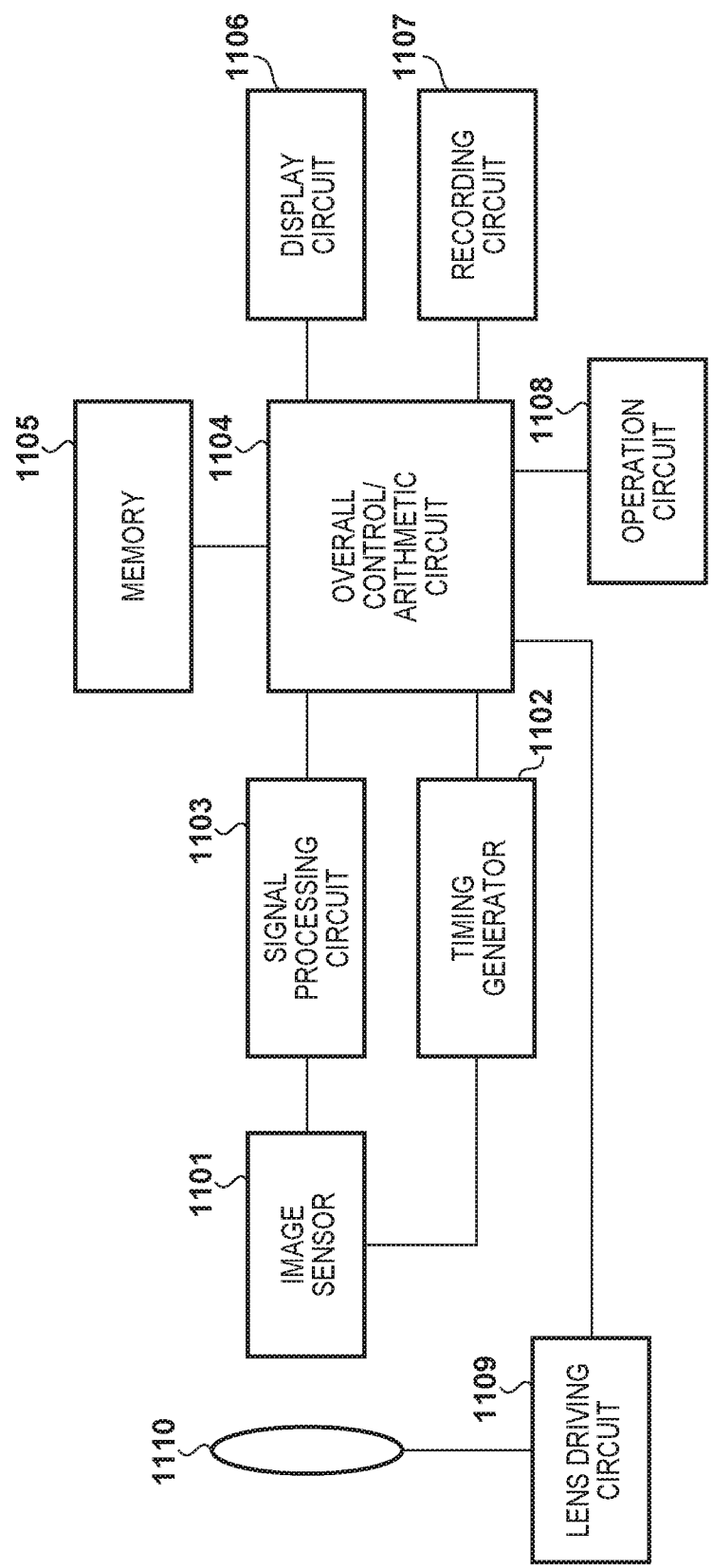
FIG. 11 is a block diagram showing an overall configuration of an image capturing apparatus according to a third embodiment.

Next, a third embodiment of the present invention will be described. FIG. 11 is a block diagram showing a configuration of the image capturing apparatus, and uses the image sensor described in the first or second embodiment as an image sensor 1101.

A lens driving circuit 1109 performs zoom control, focus control, and diaphragm control for an imaging lens unit 1110, and the imaging lens unit 1110 forms an optical image of a subject on the image sensor 1101. The image of the subject formed on the image sensor 1101 is converted into an electrical image signal, and then the image signal is output from the image sensor 1101. A signal processing circuit 1103 performs various types of corrections on the image signal output from the image sensor 1101, and compresses data. Also, in the case where each pixel of the image sensor 1101 has the configuration shown in FIG. 8, the signal processing circuit 1103 subtracts the focus detection signal read from one of the photoelectric conversion portions from the image signal acquired from the imaging sensor 1101 to generate the focus detection signal of the other of the photoelectric conversion portions.

A timing generator 1102 outputs a timing signal that drives the image sensor 1101. An overall control/arithmetic circuit 1104 performs various types of arithmetic operations and controls overall operations of the image capturing apparatus including the operations of the image sensor 1101. The overall control/arithmetic circuit 1104 further performs a phase difference focus detection operation using a pair of focus detection signals. Image data output from the signal processing circuit 1103 is temporarily stored in a memory 1105. A display circuit 1106 displays various types of information and a captured image. A recording circuit 1107 is a circuit for performing reading and writing on a detachable storage medium such as a semiconductor memory for recording or reading out image data. An operation circuit 1108 includes a group of input devices such as switches, buttons, and a touch panel, and receives a user instruction for the image capturing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-083367, filed on Apr. 24, 2018 which is hereby incorporated by reference herein in its entirety.

What is claimed is:

1. An image sensor comprising:
   a generator that generates and outputs a plurality of reference signals whose slopes of potential change per predetermined time are different from each other;
   a selector that selects one of the plurality of reference signals; and
   an analog/digital converter that converts an analog signal output from a pixel unit row by row by first driving or second driving using the reference signal selected by the selector into a digital signal,
   wherein in the first driving, a noise signal output from the pixel unit is converted into a plurality of first digital signals using the plurality of reference signals and a photoelectric conversion signal obtained by performing photoelectric conversion on incident light and output from the pixel unit is converted into a second digital signal using one of the plurality of reference signals,
   in the second driving, the noise signal is converted into the first digital signal using a predetermined one of the plurality of reference signals and the photoelectric conversion signal is converted into the second digital signal using one of the plurality of reference signals, and
   the first driving is performed intermittently.

2. The image sensor according to claim 1 further comprising:
   a holding unit that holds a digital signal converted by the analog/digital converter; and
   a processor that processes the digital signal held in the holding unit,
   wherein in the first driving, the processor subtracts, from the second digital signal, one of the plurality of first digital signals that is converted using the reference signal having the same slope as the reference signal used for converting the second digital signal, and
   in the second driving, the processor subtracts the first digital signal from the second digital signal in a case where the first digital signal and the second digital signal are converted using the reference signals having the same slope, and subtracts the first digital signal held in the holding unit that is converted using the reference signal having the same slope as the reference signal used for converting the second digital signal in a case where the first digital signal and the second digital signal are converted using the reference signals having different slopes.

3. The image sensor according to claim 2, wherein the holding unit updates the first digital signal each time the noise signal is newly converted using one of the plurality of reference signals except for the predetermined reference signal.

4. The image sensor according to claim 2, wherein the holding unit averages the first digital signals each time the noise signal is newly converted using one of the plurality of reference signals except for the predetermined reference signal.

5. The image sensor according to claim 1, wherein, in a case where a temperature of the image sensor is a second temperature that is higher than a first temperature, a frequency of performing the first driving is higher than in a case where the temperature of the image sensor is the first temperature.

6. The image sensor according to claim 1 further comprising an amplifier that applies a gain to the analog signal output from the pixel unit and outputs the amplified analog signal to the analog/digital converter,
   wherein in case where the gain is a second gain that is higher than a first gain, a frequency of performing the first driving is higher than in a case where the gain is the first gain.

7. The image sensor according to claim 1, wherein a signal from a row included in the top region of a frame is converted by the first driving.

8. The image sensor according to claim 1, wherein the plurality of reference signals are two reference signals of two different slopes, and the predetermined reference signal is the reference signal having a gentler slope.

9. The image sensor according to claim 8, wherein the analog/digital converter compares the photoelectric conversion signal and a predetermined signal level before converting the photoelectric conversion signal, and in a case where the photoelectric conversion signal is greater than the predetermined signal level, the reference signal having a steeper slope is used to convert the photoelectric conversion signal, and in a case where the photoelectric conversion signal is equal to or less than the predetermined signal level, the reference signal having the gentler slope is used to convert the photoelectric conversion signal.

10. An image sensor comprising:
a pixel unit including pixels each having a plurality of photoelectric conversion portions and corresponding to each of a plurality of microlenses arranged in matrix;
a generator that generates and outputs a plurality of reference signals whose slopes of potential change per predetermined time are different from each other;
a selector that selects one of the plurality of reference signals; and
an analog/digital converter that converts an analog signal output from a pixel unit row by row in a first mode or second mode using the reference signal selected by the selector into a digital signal,
wherein in the first mode, a noise signal output from the pixel unit is converted into a first digital signal using a predetermined one of the plurality of reference signals and a first photoelectric conversion signal obtained by performing photoelectric conversion on incident light and output from the pixel unit is converted into a second digital signal using one of the plurality of reference signals,
in the second mode, the noise signal is converted into a plurality of first digital signals using the plurality of reference signals and third and fourth photoelectric conversion signals that are read out from the pixel unit so as to be able to obtain a pair of focus detection signals having parallax are converted into third and fourth digital signals, respectively, using one of the plurality of reference signals, and
signals from a row including an area in which focus detection is performed are processed in the second mode.

11. The image sensor according to claim 10 further comprising:
a holding unit that holds a digital signal converted by the analog/digital converter; and
a processor that processes the digital signal held in the holding unit,
wherein in the first mode, the processor subtracts the first digital signal from the second digital signal in a case where the first digital signal and the second digital signal are converted using the reference signals having the same slope, and subtracts the first digital signal held in the holding unit that is converted using the reference signal having the same slope as the reference signal used for converting the second digital signal in a case where the first digital signal and the second digital signal are converted using the reference signals having different slopes, and
in the second mode, the processor subtracts, from the third and fourth digital signals, the first digital signal/signals among the plurality of first digital signals that is/are converted using the reference signal/signals having the same slope/slopes as the reference signals used for converting the third and fourth digital signals.

12. The image sensor according to claim 11, wherein the holding unit updates the first digital signal each time the noise signal is newly converted using one of the plurality of reference signals except for the predetermined reference signal.

13. The image sensor according to claim 11, wherein the holding unit averages the first digital signals each time the noise signal is newly converted using one of the plurality of reference signals except for the predetermined reference signal.

14. The image sensor according to claim 13, wherein the plurality of reference signals are two reference signals of two different slopes, and the predetermined reference signal is the reference signal having a gentler slope.

15. The image sensor according to claim 14, wherein the analog/digital converter compares the photoelectric conversion signal and a predetermined signal level before converting the photoelectric conversion signal, and in a case where the photoelectric conversion signal is greater than the predetermined signal level, the reference signal having a steeper slope is used to convert the photoelectric conversion signal, and in a case where the photoelectric conversion signal is equal to or less than the predetermined signal level, the reference signal having the gentler slope is used to convert the photoelectric conversion signal.

16. An image capturing apparatus comprising:
an image sensor comprising
a generator that generates and outputs a plurality of reference signals whose slopes of potential change per predetermined time are different from each other,
a selector that selects one of the plurality of reference signals, and
an analog/digital converter that converts an analog signal output from a pixel unit row by row by first driving or second driving using the reference signal selected by the selector into a digital signal; and
a signal processor that processes a signal output from the image sensor,
wherein in the first driving, a noise signal output from the pixel unit is converted into a plurality of first digital signals using the plurality of reference signals and a photoelectric conversion signal obtained by performing photoelectric conversion on incident light and output from the pixel unit is converted into a second digital signal using one of the plurality of reference signals,
in the second driving, the noise signal is converted into the first digital signal using a predetermined one of the plurality of reference signals and the photoelectric conversion signal is converted into the second digital signal using one of the plurality of reference signals, and
the first driving is performed intermittently.

17. An image capturing apparatus comprising:
an image sensor comprising
a pixel unit including pixels each having a plurality of photoelectric conversion portions and corresponding to each of a plurality of microlenses arranged in matrix,
a generator that generates and outputs a plurality of reference signals whose slopes of potential change per predetermined time are different from each other,
a selector that selects one of the plurality of reference signals, and
an analog/digital converter that converts an analog signal output from a pixel unit row by row in a first mode or second mode using the reference signal selected by the selector into a digital signal; and
a signal processor that processes a signal output from the image sensor,
wherein in the first mode, a noise signal output from the pixel unit is converted into a first digital signal using a predetermined one of the plurality of reference signals and a first photoelectric conversion signal obtained by performing photoelectric conversion on incident light and output from the pixel unit is converted into a second digital signal using one of the plurality of reference signals, in the second mode, the noise signal is converted into a plurality of first digital signals using the plurality of reference signals and third and fourth photoelectric conversion signals that are read out from the pixel unit so as to be able to obtain a pair of focus detection signals having parallax are converted into third and fourth digital signals, respectively, using one of the plurality of reference signals, and signals from a row including an area in which focus detection is performed are processed in the second mode.

18. A control method for an image sensor comprising a generator that generates and outputs a plurality of reference signals whose slopes of potential change per predetermined time are different from each other, a selector that selects one of the plurality of reference signals, and an analog/digital converter that converts an analog signal output from a pixel unit row by row by first driving or second driving using the reference signal selected by the selector into a digital signal, the method comprising:

controlling to perform conversion row by row by the analog/digital converter by the first driving or the second driving;

converting, in the first driving, a noise signal output from the pixel unit into a plurality of first digital signals using the plurality of reference signals and converting a photoelectric conversion signal obtained by performing photoelectric conversion on incident light and output from the pixel unit into a second digital signal using one of the plurality of reference signals; and converting, in the second driving, the noise signal into the first digital signal using a predetermined one of the plurality of reference signals and converting the photoelectric conversion signal into the second digital signal using one of the plurality of reference signals, wherein the first driving is performed intermittently.

19. A control method for an image sensor comprising a pixel unit including pixels each having a plurality of photoelectric conversion portions and corresponding to each of a plurality of microlenses arranged in matrix, a generator that generates and outputs a plurality of reference signals whose slopes of potential change per predetermined time are different from each other, a selector that selects one of the plurality of reference signals, and an analog/digital converter that converts an analog signal output from a pixel unit row by row in a first mode or second mode using the reference signal selected by the selector into a digital signal, the method comprising:

controlling to perform conversion row by row by the analog/digital converter in the first mode or the second mode;

converting, in the first mode, a noise signal output from the pixel unit into a first digital signal using a predetermined one of the plurality of reference signals and converting a first photoelectric conversion signal obtained by performing photoelectric conversion on incident light and output from the pixel unit into a second digital signal using one of the plurality of reference signals; and converting, in the second mode, the noise signal is converted into a plurality of first digital signals using the plurality of reference signals and converting third and fourth photoelectric conversion signals that are read out from the pixel unit so as to be able to obtain a pair of focus detection signals having parallax into third and fourth digital signals, respectively, using one of the plurality of reference signals, wherein signals from a row including an area in which focus detection is performed are processed in the second mode.

* * * * *